April 13, 1948.　　　L. E. ROBEY　　　2,439,634
ELECTRICAL SAFETY DEVICE
Filed July 29, 1944　　　3 Sheets-Sheet 3
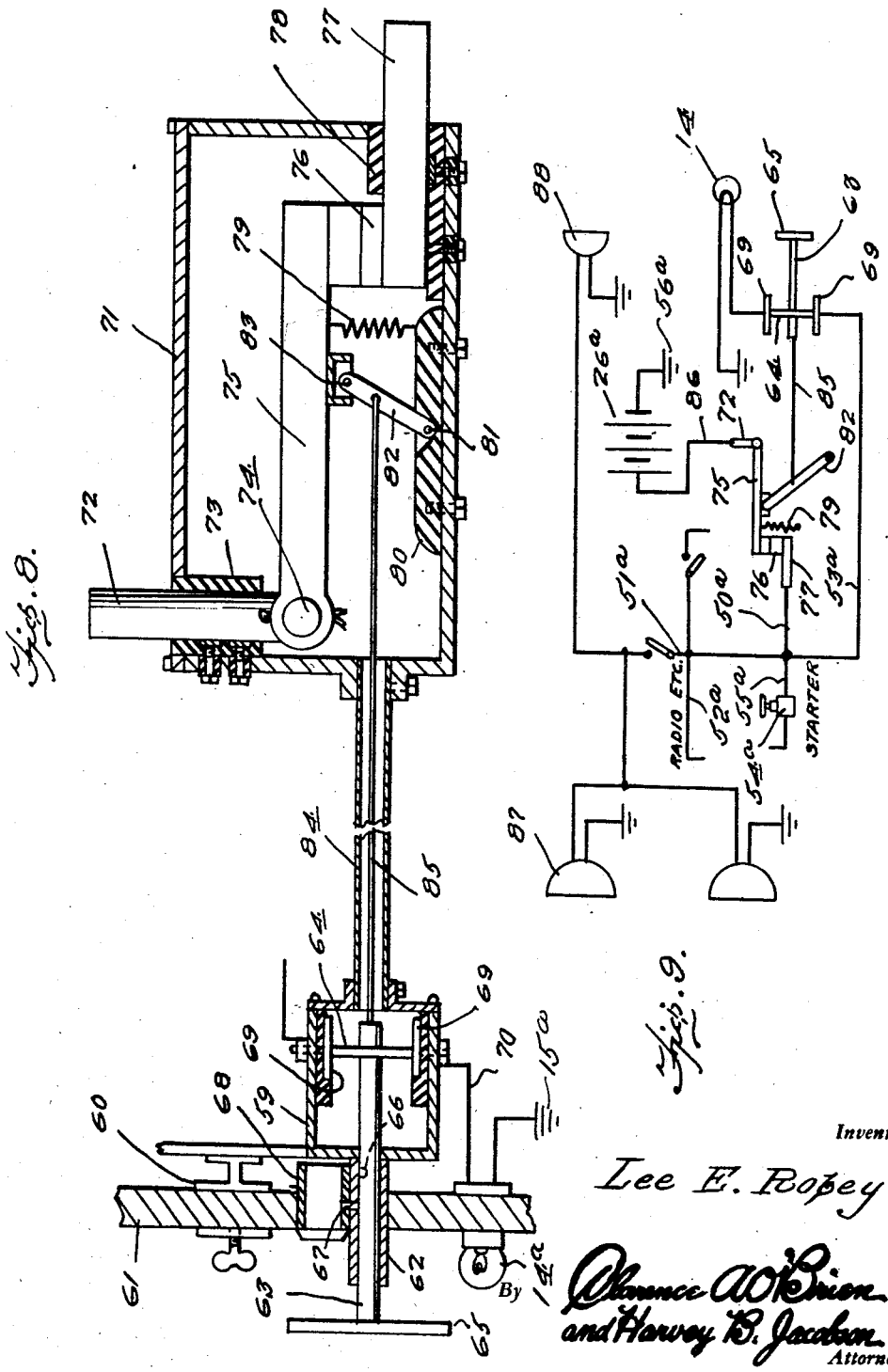
Inventor
Lee E. Robey Patented Apr. 13, 1948

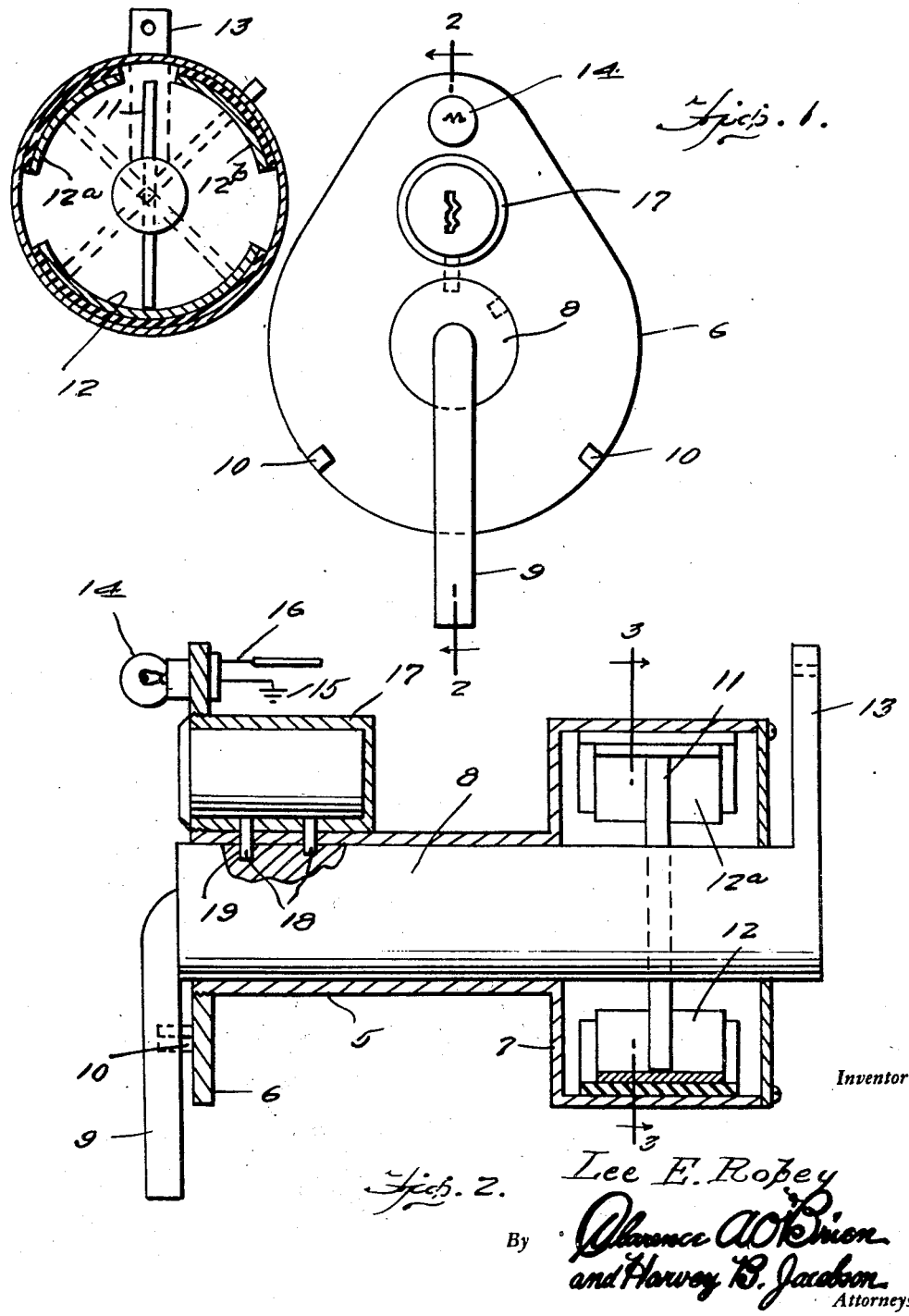

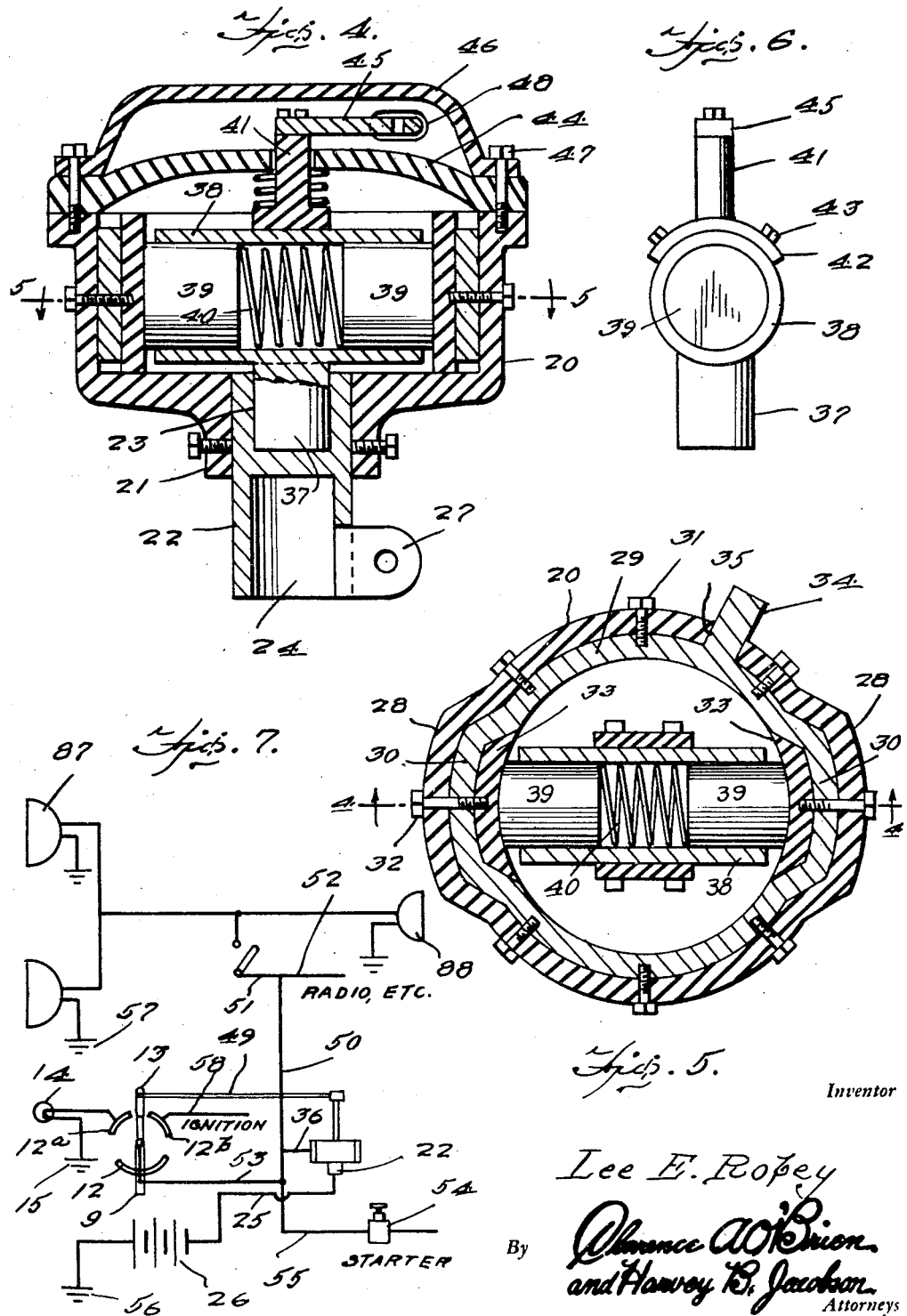

2,439,634

UNITED STATES PATENT OFFICE 2,439,634

ELECTRICAL SAFETY DEVICE

Lee E. Robey, Odenton, Md., assignor of one-half to William Reimsnider, Dorsey, Md.

Application July 29, 1944, Serial No. 547,272

4 Claims. (Cl. 177—311)

This invention relates to an electrical safety device for motor vehicles, and the primary object of the invention is to provide such a device including a master switch that is operable to simultaneously open all of the circuits of the vehicle at a point adjacent the vehicle battery and to thereby eliminate the hazards involved in the occurrence of short circuits in the wiring system of the vehicle when the latter is parked and left unattended.

More specifically, the present invention contemplates a safety device of the above kind in which means is provided to lock the master switch in circuit-opening condition, thereby preventing closing of the vehicle circuits by an unauthorized person.

A further object of the present invention is to provide a safety device of the above kind which includes an auxiliary switch provided with manual operating means and with which the locking means is associated, a signal light controlled by said auxiliary switch, and means operatively connecting the auxiliary switch with the master switch whereby the signal light will be lighted upon closing the master switch so as to indicate that the device is conditioned to supply current from the battery to the various circuits of the vehicle. Conversely, the arrangement is such that the auxiliary switch will turn the signal light off when it is operated to open the master switch, thereby giving an indication that no current is being supplied to the various circuits of the vehicle.

A more specific object of the present invention is to provide, in a safety device of the above kind, a novel and improved construction of master switch.

Still another object of the present invention is to provide a safety device of the above kind in which the auxiliary switch may be operated in one direction to supply current to the ignition system of the vehicle or in another direction to close the circuit of the signal lamp and open the circuit of the ignition system, and in which the master switch is operable to close the circuits of the vehicle when the auxiliary switch is operated in either direction. Such an arrangement permits the supply of current to the various circuits of the vehicle exclusive of the ignition system when it is desired to have the vehicle remain parked but to operate the lights, radio, et cetera, of the vehicle while said vehicle remains parked.

Other objects and features of the present invention will become apparent from the following description when considered in connection with the accompanying drawings, and the invention consists in the novel form, combination and arrangement of parts hereinafter more fully described, shown in the drawings and claimed.

In the drawings, wherein like reference characters indicate corresponding parts throughout the several views:

Figure 1 is a front elevational view of a double throw auxiliary lock switch forming part of one embodiment of the present invention.

Figure 2 is a section taken substantially on line 2—2 of Figure 1.

Figure 3 is a section taken substantially on line 3—3 of Figure 2, but drawn on a reduced scale.

Figure 4 is a central vertical sectional view of a double throw master switch adapted to be employed with and operatively connected to the switch of Figures 1 to 3, inclusive, as indicated in Figure 7, the plane of section being substantially on line 4—4 of Figure 5.

Figure 5 is a section taken substantially on line 5—5 of Figure 4.

Figure 6 is an elevational view of the movable contact element forming part of the switch shown in Figures 4 and 5.

Figure 7 is a wiring diagram illustrating the operative relation of the switches of Figures 1 and 4 and the manner of installing the same in the wiring system of a motor vehicle.

Figure 8 is a sectional view, partly broken away, illustrating another embodiment of the present invention, with the auxiliary and master switches operatively connected.

Figure 9 is a view similar to Figure 7, illustrating the manner of installing the embodiment of Figure 8 in the wiring system of a motor vehicle.

Referring in detail to Figures 1 to 3, inclusive, there is shown an auxiliary switch forming part of one embodiment of the present invention and including a horizontal bearing sleeve 5 having a face plate 6 at one end and a casing 7 at the other end. Journaled in the bearing sleeve 5 is a shaft 8 that has a rigid depending handle 9 at one end disposed in front of the face plate 6, swinging movement of handle 9 being limited in opposite directions by stop lugs 10 provided on the lower portion of face plate 6 at opposite sides of said handle 9. The shaft 8 extends rearwardly through the casing 7 and has fixed therein a transverse or diametric contact bar 11 whose ends project above and below the shaft 8. Secured on and insulated from the inner surface of the peripheral wall of casing 7 are three spaced stationary contact plates 12, 12a and 12b, the contact plate 12 being longer than the contact plates 12a and 12b, as shown clearly in Figure 3. The ends of the bridging contact bar 11 are arranged to ride upon the inner surfaces of the contacts 12, 12a and 12b, and the arrangement is such that one end of contact bar 11 will always engage the contact plate 12, while the other end of contact bar 11 may be positioned intermediate the contacts 12a and 12b or in engagement with either of the latter, depending upon the position to which the handle 9 is swung. The rear projecting end of shaft 8 is provided with an upwardly extending crank arm 13, and carried by and disposed in front of the face plate 6 is a small incandescent lamp 14 having one terminal grounded, as at 15, and adapted to have its other terminal connected by wire 16 with the contact 12a. A cylinder lock 17 is mounted in the face plate 6 above the bearing 5, and has bolts 18 projectible through openings of bearing 5 into sockets 19 provided in shaft 8 when the latter is rotatably adjusted to the position shown in Figures 1 to 3, inclusive, with the contact bridging bar 11 disposed so that its upper end is midway between the contacts 12b and 12a. The lock 17 is thus used to lock the auxiliary switch in open position, and by the use of a proper key, the bolts 18 may be retracted so as to permit rotation of shaft 8 and engagement of contact bridging bar 11 with either of the contacts 12a or 12b.

The switch of Figures 1 to 3, inclusive, is adapted for use in connection with the master switch shown in Figures 4 to 6, inclusive, as illustrated in Figure 7. The master switch of Figures 4 to 6, inclusive, embodies a cup-shaped casing 20 of insulating material, and formed centrally of its bottom wall with a collar 21 in which is secured one end of a fitting 22 provided with cylindrical sockets 23 and 24 in the opposite ends thereof. The socket 24 is adapted to receive the end of a cable for connecting the fitting 22 with one terminal of a battery of the motor vehicle, as respectively indicated at 25 and 26 in Figure 7. The end of fitting 22 provided with the socket 24 is preferably split and provided with ears 27 that may be drawn together by bolt and nut means to effectively secure the end of the cable in the socket 24. As shown clearly in Figure 5, the casing 20 is outwardly offset at opposite sides, as indicated at 28, and fitted in the casing 20 is a contact element 29 in the form of a continuous band of conducting material having opposite outwardly offset portions 30 fitting in the offset portions 28 of casing 20. This contact band is secured in place by screws 31 or the like. Seated in the offset portions 30 of the contact band 29 and secured therein by screws 32 are insulating plates 33 whose inner surfaces are flush with the inner surface portions of contact band 29 at opposite sides of the offsets 30. At a suitable point, the contact band 29 is provided with an outwardly extending post 34 that projects through an opening at 35 in the casing 20 and is adapted to receive the terminal of a wire 36 for connection with the various circuits of the motor vehicle, as shown in Figure 7.

A movable contact is rotatably disposed in the casing 20 and consists of a stub shaft 37 rotatably fitting in the socket 23 and having a hollow or tubular crosshead 38 at its upper end within the opposite ends of which are slidably fitted brushes 39 arranged to engage the inner surface of the contact band 29 and the inner surfaces of the insulating plates 33. The brushes 39 are yieldingly projected by means of a compression spring 40 interposed therebetween. A shank 41 is formed with an arcuate flange 42 at its lower end which embraces the upper portion of the cross piece or head 38 and is secured to the top of the latter by means of screws 43. Shank 41 rotatably extends through a false cover 44 of casing 20 and has secured on its upper end a crank arm 45. An upper cover 46 is secured, together with the false cover 44, upon the top of the casing 20 by means of screws 47. The lever 45 is located between the covers 44 and 46 and has its free end aligned with an opening 48 in one side of the cover 46. As shown in Figure 7, the crank arm 13 of the auxiliary switch is operatively connected with the crank arm 45 of the master switch by means of a connecting rod 49. In practice, the connection between arm 13 and arm 45 is preferably of the Bowden wire type in which the rod 49 is flexible and extended through a flexible guide tube. By the use of this well known type of operating connection, the master switch may be located at a remote point relative to the auxiliary switch and adjacent the battery 26, the auxiliary switch being mounted in the instrument board of the motor vehicle. The arrangement is such that when the auxiliary switch is locked in open position, as shown in Figures 1 to 3, inclusive, the master switch is simultaneously conditioned in circuit-opening position, as shown in Figures 4 and 5. However, the master switch will be closed regardless of which direction the movable contact thereof is moved to cause its brushes 39 to pass from the insulating plates 33 to the contact band 29. In installing this embodiment of the invention in the wiring system of a motor vehicle, the fitting 22 is connected by cable 25 to one side of battery 26, as previously described, while the contact band 29 is connected by wire 36 to a main line wire 50. Connections are made from line wire 50 with the lighting system of the vehicle, as at 51; to a radio or other accessories, as at 52; to the contact 12, as at 53, and to the starter switch 54 of the vehicle, as at 55. The other side of battery 26 may be grounded, as at 56, and likewise with respect to corresponding sides of the headlights, tail light, signal light, 14, et cetera, as indicated at 57 and 15. A further wire 58 may connect contact 12b with the ignition switch of the vehicle. In use, the auxiliary switch is locked in open position, as shown by full lines in Figures 2 and 3, so as to simultaneously lock the master switch in open position, as shown in Figures 4 and 5, thereby opening all of the circuits of the vehicle simultaneously at a point adjacent the battery 26. Thus, should a short circuit occur in any of the vehicle circuits while the car is parked and left unattended, no detrimental effects will result because no current is supplied to said circuits. At the same time, closing of said circuits by an unauthorized person is prevented. When an authorized person desires to supply current to the various circuits of the vehicle, he simply unlocks the lock 17 and rotates the shaft 8 in the desired direction. Should it be desired to close all circuits of the vehicle except the ignition circuit in order to use the lights, radio, or the like, while the vehicle remains parked, the handle 9 will be swung to the right of Figure 1 so as to cause the contact bridging bar 11 to simultaneously engage contact plate 12 and contact plate 12a. When this is done, the movable contact of the master switch is turned in one direction so that both brushes 39 are moved into engagement with contact band 29 at opposite sides of the respective insulating plates 33. By thus closing the master switch, current is allowed to flow from the battery to all of the circuits except the ignition circuit, the latter circuit being opened by reason of lack of connection between the contact plates 12 and 12b of the auxiliary switch. At this time, however, current will flow to and cause lighting of the pilot or signal lamp 14, thereby advising the user that the circuits of the vehicle are alive except the ignition circuit. By turning the handle 9 to the left of Figure 1, the same effect will be had except that current is additionally supplied to the ignition circuit and signal lamp 14 is turned off, the contact bridging bar 11 being then simultaneously engaged with contact plates 12 and 12b and disengaged from contact plate 12a. Also, at this time, the movable contact of the master switch is swung in the opposite direction so that its brushes 39 engage the contact band 29 at the other sides of the insulating plates 33. Thus, both switches are of the double throw type having two circuit-closing positions.

The embodiment of the invention shown in Figures 8 and 9 involves the combined use of auxiliary and master switches of the single throw type, and is particularly adapted for ready installation upon existing motor vehicles. In using switches of the single throw type, the auxiliary switch is not used to selectively light the signal lamp and open the ignition circuit or to turn the signal lamp off and close the ignition circuit, as with the embodiment of Figures 1 to 7, inclusive. Otherwise, however, this second embodiment is intended to operate in the same general way as the embodiment already described. Referring in detail to the embodiment of Figures 8 and 9, it will be seen that the same includes an auxiliary switch having a casing 59 that may be secured by means of a clamp 60 to the instrument board 61 of the vehicle. Casing 59 has a forwardly projecting guide sleeve 62 through which slidably extends the operating bar 63 of a sliding contact bridging element 64 movable in casing 59. The projecting rear end of bar 63 has a suitable handle 65, and provided in bar 63 is a notch 66 adapted to receive the bolt 67 of a cylinder lock 68 when the auxiliary switch is in circuit-opening position. Lock 68 is suitably mounted in the instrument board 61, as is also the signal lamp 14a. The auxiliary switch further includes suitably insulated fixed contacts 69 disposed at opposite sides of the bridging element 64 and engageable by the ends of the latter. The arrangement is such that when the bar 63 is pulled rearwardly to a position wherein the bridging element 64 rides off of the contacts 69, the notch 66 will be registered with the locking bolt 67 of the lock 68, so that the switch may be locked in circuit-opening position. One contact 69 is connected by a wire 70 with a terminal of lamp 14a, the other terminal of said lamp being grounded, as at 15a.

This embodiment of Figures 8 and 9 further includes a single throw master switch including a casing 71 having a terminal post 72 secured in an insulating sleeve 73 fastened to one end of said casing 71 and disposed so that the post 72 projects upwardly through the top wall of casing 71, as shown. At its lower end and within the casing 71, post 72 has a lateral pintle 74 upon which is pivotally mounted one end of a swinging contact member 75. The other end of contact member 75 is movable into and out of engagement with the adjacent inner end of a contact portion 76 of a second post 77 that projects through the other end of the casing adjacent the bottom of the latter and is secured in an insulating sleeve 78 fastened within the casing. Contact member 75 is normally yieldingly engaged with contact element 76 by means of a helical tension spring 79. Secured upon the bottom of casing 71 beneath the contact member 75 is an insulating plate 80 upon which is pivoted at 81 the lower end of a cam lever 82 whose other end carries a shoe 83 slidably bearing against the under side of the contact member 75 intermediate its ends. The cam lever 82 is of a greater length than the normal distance between the plate 80 and contact member 75 and it normally assumes the inclined position of Figure 8. Thus, when cam lever 82 is moved to the left of Figure 8, it acts upon contact member 75 so as to raise the same against the action of spring 79 and disengage it from the contact member 76 so as to open the circuits of the vehicle. The flexible guide tube 84 of a Bowden wire device is coupled at one end to casing 59 of the auxiliary switch and at its other end to the casing 71 of the master switch. The flexible operating wire of this Bowden wire device, indicated at 85, operatively connects the rod 63 of the auxiliary switch with the lever 82 of the master switch, and the arrangement is such that when rod 63 is released, spring 79 returns the auxiliary switch to circuit-closing position and the master switch to a similar position. On the other hand, when the rod 63 is pulled rearwardly, the auxiliary switch is opened by causing bridging element 64 to pass off of contacts 69, and the master switch is simultaneously opened by causing cam lever 82 to disengage contact member 75 from contact element 76. This device is installed on a vehicle by connecting the post 72 with one side of the battery 26a by means of a cable 86, the other side of the battery being grounded, as at 56a. The other post 77 is connected to the main line wire 50a from which connections are made at 51a with the lighting circuit; at 52a to a radio or the like; at 53a to the other terminal of a contact 69 of the auxiliary switch; and at 55a with the starter switch 54a of the vehicle. By viewing Figure 9, it will be seen that a pull on rod 63 may open both switches simultaneously so as to simultaneously open all of the vehicle circuits and at the same time open the circuit of the signal lamp 14a, it being possible to lock the switches in this open position by means of the lock 68. On the other hand, when the rod 63 is released, the switches will both be closed so as to close all of the vehicle circuits simultaneously and at the same time cause lighting of signal lamp 14a to advise the user of the fact that the vehicle circuits are closed. In both forms of the invention, the vehicle headlights are indicated at 87 and the tail light at 88.

From the foregoing description, it is believed that the construction and operation, as well as the advantages, of both embodiments of the invention will be readily understood and appreciated by those skilled in the art. Minor changes in details of construction are contemplated, such as fall within the spirit and scope of the invention as claimed.

What I claim is:

1. A safety device of the character described, comprising an auxiliary switch having means mounting the same on the instrument board of a motor vehicle, said switch including a movable contact element shiftable to a circuit-opening or closing position and having an operating handle, means to releasably lock said movable contact element in circuit-opening position, a signal lamp having a circuit controlled by said auxiliary switch, a master switch having a movable contact shiftable to circuit-opening or circuit-closing position and mounted remote to the auxiliary switch adjacent the vehicle battery, and a flexible operating connection between the movable contact elements of said switches whereby opening of one will cause opening of the other and closing of the one will cause closing of the other, said master switch having means to connect its movable contact element with one side of the battery and including a stationary contact element for connection with the several circuits of the vehicle, whereby opening of the master switch will cause simultaneous opening of all of the vehicle circuits.

2. A construction as defined in claim 1, wherein both switches are of the multi-throw type, the master switch being constructed to close the vehicle circuits in either of its two positions, the auxiliary switch being constructed to close the circuit of the signal lamp in only one of its positions and to close the ignition circuit of the vehicle in the other of its positions.

3. A safety device for a motor vehicle, comprising an auxiliary switch including a movable contact element having a handle, means to mount said element on the motor vehicle so as to be operable from the driver's seat of the latter, a signal having a circuit controlled by said auxiliary switch, a master switch mounted on the vehicle remote from said movable contact element and adjacent the vehicle battery, said master switch having a movable contact operable to open and close several circuits of the vehicle, an operating connection between said movable contact element of the auxiliary switch and the movable contact of said master switch, and means to releasably lock said movable contact element of the auxiliary switch against movement with the movable contact of the master switch in circuit-opening position.

4. The construction defined in claim 3, wherein said operating connection includes a flexible member attached at one end to said movable contact element of the auxiliary switch and operatively connected at its other end adjacent the master switch to said movable contact of the latter.

LEE E. ROBEY.

REFERENCES CITED

The following references are of record in the file of this patent:

UNITED STATES PATENTS

| Number | Name | Date |
|---|---|---|
| 1,146,204 | Pearce | July 13, 1915 |
| 1,256,125 | Goldmerstein | Feb. 12, 1918 |
| 1,295,410 | Zabel | Feb. 25, 1919 |
| 1,579,559 | Moll | Apr. 6, 1926 |
| 1,612,560 | Balch | Dec. 28, 1926 |
| 1,628,209 | Wilcox | May 10, 1927 |
| 1,793,033 | Welling | Feb. 17, 1931 |
| 1,988,330 | Pettersson et al. | Jan. 15, 1935 |
| 2,042,667 | Latzko et al. | June 2, 1936 |
| 2,109,238 | Sessions | Feb. 22, 1938 |
| 2,197,692 | Gill | Apr. 16, 1940 |